United States Patent Office 3,553,170
Patented Jan. 5, 1971

3,553,170
COPOLYMERS OF VINYLBORON COMPOUNDS
William G. Woods, Fullerton, Irving S. Bengelsdorf, Tustin, and Don L. Hunter, Long Beach, Calif., assignors to United States Borax & Chemical Corporation, Los Angeles, Calif., a corporation of Nevada
No Drawing. Continuation-in-part of application Ser. No. 139,343, Sept. 20, 1961. This application Oct. 19, 1965, Ser. No. 498,122
The portion of the term of the patent subsequent to Feb. 8, 1983, has been disclaimed
Int. Cl. C08f 19/00, 19/02, 19/10
U.S. Cl. 260—66          12 Claims

ABSTRACT OF THE DISCLOSURE

Copolymers of a vinyldioxaborinane with an olefinicly unsaturated compound which is different from the vinyldioxaborinane and which contains unsaturated

groups.

This application is a continuation in part of our copending application, Ser. No. 139,343, filed Sept. 20, 1961, now U.S. 3,234,191.

The present invention relates to a new class of copolymers prepared from vinyldioxaborinances.

Broadly stated, the present invention comprises copolymers of vinyldioxaborinanes with other vinyl compounds.

The copolymer is obtained from the intermolecular reaction of a vinyldioxaborinane with an olefinicly unsaturated compound which is different than the vinyldioxaborinane and which contains unsaturated

groups, such as, for example, styrene, halogen and alkyl substituted styrenes, butadiene, diallyl phthalate, methyl methacrylate, acrylamide, vinyl chloride, vinyl acetate, vinyl isobutyl ether, and acrylonitrile.

It is the principal object of the present invention to provide a new class of copolymers of the vinyldioxaborinanes.

It is a further object of this invention to provide means for preparing this new class of boron-containing copolymers.

Other objects of the present invention will appear as the description proceeds.

To the accomplishment of the foregoing and related ends, said invention comprises the features hereinafter fully described and particularly pointed out in the claims, the following description setting forth in detail certain illustrative emboidments of the invention, these being indicative, however, of but a few of the various ways in which the principle of the invention may be employed.

Briefly, the above objects are attained by providing a copolymer of a vinyldioxaborinane and copolymerizable ethylenically unsaturated monomer, which is different from the said vinyldioxaborinane. The vinyldioxaborinane has the formula:

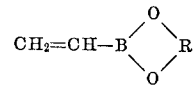

where R is an alkylene radical, 3 carbon atoms in length and containing a total of 3 to 20 carbon atoms. The copolymerizable ethylenically unsaturated monomer contains a

group, which is different than the vinyldioxaborinane, and is polymerizable with vinyl compounds through free radical initiation.

The vinyldioxaborinanes are six membered ring compounds; the ring consists of one boron atom, two oxygen atoms, and three carbon atoms, and the vinyl radical is always bonded directly to the boron atom. Thus, the vinyldioxaborinanes are glycol ethyleneboronates as illustrated by the formula:

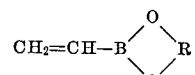

where R is an alkylene radical, 3 carbon atoms in length and containing a total of from 3 to 20 carbon atoms.

Illustrative vinyldioxaborinane monomers applicable to the present invention are:

2-vinyl-4,4,6-trimethyl-1,3,2-dioxaborinane,
2-vinyl-1,3,2-dioxaborinane,
2-vinyl-4-propyl-5-ethyl-1,3,2-dioxaborinane,
2-vinyl-4,4-dimethyl-1,3,2-dioxaborinane,
2-vinyl-4-methyl-1,3,2-dioxaborinane,
2-vinyl-5,5-dimethyl-1,3,2-dioxaborinane,
2-vinyl-4,4,5-trimethyl-1,3,2-dioxaborinane,
2-vinyl-5-methyl-5-ethyl-1,3,2-dioxaborinane,
2-vinyl-5-methyl-5-propyl-1,3,2-dioxaborinane.

The vinyldioxaboinanes ae believed to be new chemical compounds and their methods of perparation are more fully described and specifically claimed in our co-pending application entitled, "Vinylboron Compounds And Means For Preparing The Same," Ser. No. 226,743 filed Sept. 27, 1962, now U.S. 3,234,259, which is in turn a continuation in part of application Ser. No. 135,555, filed Aug. 24, 1961, and now abandoned, which applications are incorporated herein by reference.

The following examples are illustrative of methods for preparing the vinyldioxaborinane monomers:

I

A 500 ml. round-bottomed flask containing 75 ml. of ether was cooled to −70° C. With constant agitation, 54 ml. (0.25 mole) of 2-n-butoxy-4,4,6-trimethyl-1,3,2-dioxaborinane and 96.2 ml. (0.25 mole) of 2.60 M vinyl magnesium chloride solution in tetrahydrofuran were simultaneously added in increments to the ether over a 16 minute interval. A solid precipitate formed which dissolved when the reaction mass was allowed to warm to room temperature. About one-half of the tetrahydrofuran and all of the ether was then removed by distillation at atmospheric pressure. The pressure was then reduced to about 1 mm. and the temperature increased to about 210° C., and the liquid which distilled off was recovered. This distillate was then fractionally distilled and 30.65 grams (79.2% yield) of 2-vinyl-4,4,6-trimethyl-1,3,2-dioxaborinane, B.P. 69–70° C. at 35 mm., was recovered.

II

A liter round-bottomed flask containing 200 ml. of ether was chilled to −70° C. With constant agitation, 172 grams (1 mole) of 2-n-butoxy-4-methyl-1,3,2-dioxaborinane and 386 ml. (1 mole) of 2.59 M vinyl magnesium chloride solution in tetrahydrofuran were simultaneously added in increments to the ether over 43 minute interval. A solid precipitate formed which dissolved when the reaction mass was allowed to warm to room temperature. About one-half of the tetrahydrofuran and all of the ether was removed by distillation at atmospheric pressure. Five hundred ml. of mineral oil was then added to the reaction vessel and the reaction mass was heated to about 200° C., and the liquid which distilled off was recovered. This distillate was then fractionally distilled and 90.5 grams (71.4% yield) of 2-vinyl-4-methyl-1,3,2-dioxaborinane, B.P. 64–65° C. at 40 mm., was recovered.

There are numerous unsaturated compounds containing

groupings which are different that the vinyldioxaborinanes and which are copolymerizable therewith and which are referred to herein as "the second monomer." The comonomers of particular interest for use in the present invention are the vinyl aromatic compounds such as styrene and substituted styrenes, vinyl aliphatic compounds such as acrylonitrile, acrylic esters, and acrylamides, allylic esters, and various other allylic compounds. However, the present invention contemplates the use of any vinyl compound which is copolymerizable with the vinyldioxaborinanes.

Illustrative of some of the olefinicly unsaturated compounds which are applicable for use in the preparation of the copolymers of the present invention are: styrene, butadiene, o-chlorostyrent, p-ethylstyrene, a-methylstyrene, vinyl acetate, vinyl chloride, diallyl phthalate, allyl acrylate, diallyl maleate, allyl acetate, acryonitrile, methacrylonitrile, ethacrylonitrile, ethyl acrylate, methyl methacrylate, acrylamide, methacrylamide, vinyl acrylate, vinyl cyclohexane, vinyl cyclohexene methyl vinyl ketone, vinyl isobutyl ether, and N-vinyl pyrrolidone.

It is to be clearly understood that the foregoing list is only a partial enumeration of the comonomers applicable to the present invention and is not intended to limit the invention.

Copolymerization, according to the present invention, can be initiated by catalysts or the copolymerization reactions can be initiated thermally or by the use of ultraviolet light. In the prefered embodiment of the invention the copolymers are prepared under anhydrous conditions with the aid of a free-radical or an ionic polymerization initiator catalyst.

The polymerization catalysts useful in the present invention thus include:

free-radical catalysts such as: a,a'-azo-bis-isobutyronitrile dimethyl-α,α'-azo-bis-diisoburate, benzoyl peroxide, t-butyl hydroperoxide.

anionic catalysts such as: metallic sodium, metallic potassium, sodium naphthalene complex, amylsodium, amylpotassium; and cationic catalysts such as: boron trifluoride (gaseous), boron trifluoride-etherate complex, p-toluenesulfonic acid, stannic chloride, and aluminum chloride.

The vinyldioxaborinanes admixed with copolymerizable in bulk, in anhydrous heterogeneous mixtures, or in anhydrous solutions to yield the desired copolymers. The choice of solvent used to act as the reaction medium is dependent on the catalyst and polymerizable materials used in any specific polymerization reaction. Benzene, toluene, xylene, hexane, tetrahydrofuran, chlorobenzene, chloroform, methylene chloride, ether, and carbon tetrachloride are but a few of the solvents which are applicable for use in performing the present polymerization reactions. The polymers of the present invention can be recovered by evaporation, freeze-dry techniques, or by precipitation with a polar solvent.

The polymerization reactions can be performed over a wide temperature range; the upper limit being the decomposition temperature of any of the monomeric compounds present. Generally, the reactions are carried out at the boiling point of the lowest boiling constituent of the reaction mass on the order of from about 20° C. to about 150° C. However, when certain of the ionic catalysts are used to initiate the polymerization reaction, it is advantageous to carry out the polymerization at much lower temperatures, from about −80° C. to about 20° C. Thus, the preferred temperature range for carrying out the polymerization reaction will be from about −80° C. to about 150° C.

The copolymers of the present invention comprise from about 1% to about 99% by weight of the monomeric unit introduced by the vinyldioxaborinane, preferably 20–80% by weight and most preferably 40–60% by weight of the vinyldioxaborinane monomeric unit, and are prepared, as previously described, from an admixture of a vinyldioxaborinane and unsaturated compounds having

groups and which are copolymerizable with the vinyldioxaborinane. These copolymers have profoundly different physical properties than the polymers prepared from the unsaturated compounds themselves. For example, a vinyldioxaborinane when copolymerized in various proportions with acrylonitrile, provides polymeric materials having definite softening points and which are soluble in the common nonpolar organic solvents, whereas the polyacrylonitriles themselves do not have definite softening points and they are not soluble in the common nonpolar solvents. Furthermore, fibers prepared from these acrylnitrile-vinyldioxaborinane copolymers also have the much desired property of increased dye receptivity.

The copolymers will have structural units of the formula:

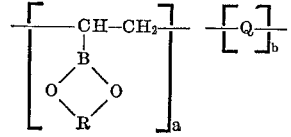

where R has been defined above, Q is the copolymerizable ethylenically unsaturated monomer which is different from the vinyldioxaborinane and the ratio of $a:b$, which indicates the molar ratio of vinyldioxaborinane: second monomer in the copolymer, is broadly about 1:99 to 99:1 (corresponding to about 1% to about 99% by weight of the vinyldioxaborinane monomer unit), preferably 1:4 to 4:1 (corresponding to 20–80% by weight of the monomeric unit introduced by the vinyldioxaborinane), and more preferably 1:1.5 to 1.5:1 (corresponding to 40–60% by weight of the vinyldioxaborinane monomeric unit.)

The copolymers may vary widely in physical properties. For example, the degree of branching and the molecular weight can vary over a wide range. As is well-known in the polymerization art, the degree of functionality of the monomers will control the degree of branching in the polymer and whether the polymer is straight-chain or cross-linked. In the instant invention, for example, a monomer such as styrene will produce a primarily straight-chain polymer whereas a monomer such as diallyl phthalate or butadiene will produce a predominately cross-linked polymer. Also, it is well-known that varying the reaction conditions will vary the molecular weight of the resultant copolymer, which may contain some graft and/or block copolymers. The preferred copolymers of this invention are thermoplastic polymers, but the copolymers can be cross-linked to varying degrees, by proper selection of the functionality and the molar ratios of the monomers, to form thermosetting polymers, as is well-known to those in the polymerization art.

While the molecular weight can vary over a wide range, as mentioned above, the preferred range is from about 10,000 to about 500,000, or about 80 to about 4,000 repeating monomeric units. A given composition may contain a large number of varying chain lengths of the copolymer. These chains may vary from dimers to very high molecular weight units.

The following further examples also illustrate the invention:

III

To a 500 ml. round-bottomed flask equipped with a magnetic stirrer, a nitrogen inlet and a reflux condenser and containing about 100 ml. of benzene was placed 15.5 grams (0.149 mole) of styrene, 15.0 grams (0.097 mole) of 2-vinyl-4,4,6-trimethyl-1,3,2-dioxaborinane and 0.3 grams (0.0018 mole) of α,α'-azo-bis-isobutyronitrile. The reaction mass was then heated at reflux under a nitrogen atmosphere with constant agitation for 136 hours. The benzene was removed by freeze-drying and white glassy friable solid copolymer, soluble in the common nonpolar organic solvents, was recovered.

The copolymer had a recurring monomeric unit of the formula:

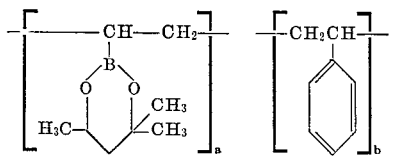

where the ratio $a:b$ was about 1:5.6, and the copolymer had an intrinsic viscosity of 0.106 in benzene solution at 30° C.

IV

To a 500 ml. round-bottomed flask equipped with a magnetic stirrer, a nitrogen inlet and a reflux condenser and containing about 100 ml. of toluene was placed 11.8 grams (0.1 mole) of p-methylstyrene and 10 grams (0.08) of 2-vinyl-4-methyl-1,3,2-dioxaborinane. To this was added 0.3 gram (0.013 mole) sodium as a dispersion in toluene. After about 16 hours of shaking at about 20° C., the reaction mass was allowed to stand at room temperature for 2 hours. The product, a solid white glassy copolymer, was precipitated from the solution by the addition of methanol and was recovered by decanting off the liquid portion of the reaction mass. The copolymer had a recurring monomeric unit of the formula:

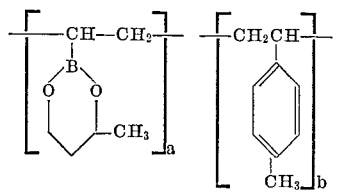

where the ratio $a:b$ was about 0.08:0.1.

V

To a 500 ml. round-bottomed flask equipped with a nitrogen inlet, a magnetic stirrer and a reflux condenser and containing about 100 ml. of benzene was placed 15.0 grams (0.15 mole) of methyl methacrylate, 15.0 grams (0.097 mole) of 2-vinyl-4,4,6-trimethyl-1,3,2-dioxaborinane and 0.3 gram (0.0018 mole) of α,α'-azo-bis-isobutyronitrile. The reaction mass was then heated at reflux under a nitrogen atmosphere with constant agitation for 136 hours. The benzene was then removed by freeze-drying and a clear glassy friable solid, soluble in the common nonpolar organic solvents was recovered. The copolymer had a recurring monomeric unit of the formula:

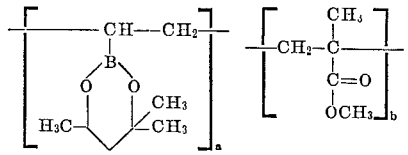

where the ratio $a:b$ was about 1:2.24 and the copolymer had an intrinsic viscosity of 0.090 in methyl ethyl ketone solution at 30° C.

VI

To a 500 ml. round-bottomed flask equipped with a magnetic stirrer, a nitrogen inlet and a reflux condenser and containing about 100 ml. of benzene was added 4.9 grams (0.092 mole) of acrylonitrile, 14.2 grams (0.092 mole) of 2-vinyl-4,4,6-trimethyl-1,3,2-dioxaborinane and 0.2 gram (0.0012 mole) of α,α'-azo-bis-isobutyronitrile. The reaction mass was then heated at about 80° C. under a nitrogen atmosphere with constant agitation for 64 hours. The benzene was then removed by freeze-drying and an off-white colored friable solid copolymer, soluble in the common nonpolar organic solvents was recovered. The copolymer had the formula:

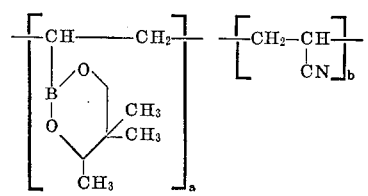

where the ratio $a:b$ was about 1:1.25 and the copolymer had a molecular weight of 10,860 as determined cryoscopically in benzene.

VII

To a 500 ml. round-bottomed flask equipped with a magnetic stirrer, a nitrogen inlet and a reflux condenser and containing about 100 ml. of n-heptane was added 7.1 grams (0.10 mole) of acrylamide, 12.6 grams (0.10 mole) of 2-vinyl-4-methyl-1,3,2-dioxaborinane and 1.46 grams (0.01 mole) of t-butylhydroperoxide. The reaction mass was then heated at reflux in a nitrogen atomsphere with constant agitation for 24 hours. The product, a pale-colored, glassy, friable solid, was isolated by pouring the solution into excess methanol and filtering off the liquid portion of the resultant slurry. The copolymer had the formula:

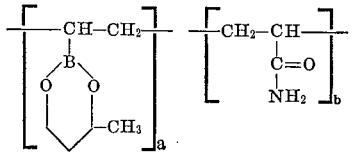

VIII

To a 500 ml. round-bottomed flask equipped with a magnetic stirrer, a nitrogen inlet and a reflux condenser and containing about 100 ml. of benzene was added 14.5 grams (0.113 mole) of n-butyl acrylate, 9.5 grams (0.085 mole) of 2-vinyl-1,3,2-dioxaborinane and 0.24 gram (0.01 mole) of benzoyl peroxide. The reaction mass was then heated at reflux under a nitrogen atmosphere with constant agitation for 40 hours. The benzene was then removed by freeze-drying and a colorless glassy copolymer which is soluble in the common nonpolar organic solvents was recovered. The copolymer had a recurring monomeric unit of the formula:

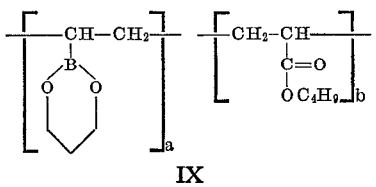

IX

To a one liter round-bottomed flask equipped with a magnetic stirrer, a nitrogen inlet and a reflux condenser and containing about 200 ml. of methylene chloride was added 24.6 grams (0.10 mole) of diallyl phthalate and 11.2 grams (0.10 mole) of 2-vinyl-1,3,2-dioxaborinane. The solution was cooled to −20° C. and 0.5 gram (0.0074 mole) of boron trifluoride dissolved in diethyl ether was added. The reaction was then allowed to warm slowly to room temperature under a nitrogen atmosphere with constant agitation. The copolymer was then recovered by destroying the catalyst with methanol, filtering, and removing the methylene chloride.

As Examples III, IV, V and VIII used an excess of the second monomer, the copolymer chain contained short segments of homopolymer of the second vinyl monomer. The amount of such homopolymer may naturally be controlled by varying the molar ratio of the comonomers.

Among the preferred copolymers of this invention are the copolymers which have the following structural units:

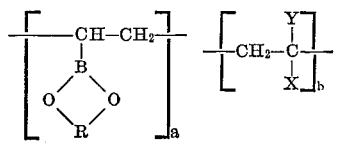

where R has been defined above, Y is hydrogen or lower alkyl, X is phenyl, halophenyl, lower alkyl phenyl, lower acyloxy, amido cyanide, lower alkyl cyanide, tetra- and hexa-hydrobenzene, lower alkyl carboxy, lower alkyl keto, or pyrrolidone, and the weight ratio of $a:b$ is 1:99 to 99:1, preferably 1:4 to 4:1, and most preferably 1:1.5 to 1.5:1.

The copolymers of the present invention have a wide variety of industrial applications. They are resistant to oxidation and hydrolysis. Many of the copolymers can be prepared having low softening points and find utility as polymeric fluids for effective neutron absorption application. The present copolymers can be used as molding compositions, with or without the addition of fillers; they can be cast, and they can be used as sizing, adhesive and binding agents for paper, cotton and other cellulosic materials. Various of the copolymers can also be used in the preparation of synthetic fibers which are readily receptive to dyes.

Other modes of applying the principle of the invention may be employed, change being made as regards the details described, provided the feature stated in any of the following claims or the equivalent of such be employed.

What is claimed is:

1. The copolymer of claim 7 wherein said copolymer has the structural units of the formula:

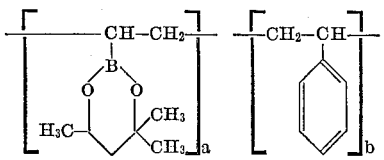

where the ratio $a:b$ is about 1:5.6.

2. The copolymer of claim 7 wherein said copolymer has the structural units of the formula:

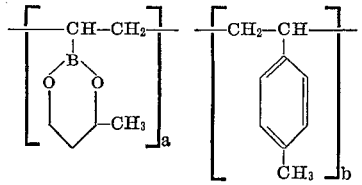

3. The copolymer of claim 7 wherein said copolymer has the structural units of the formula:

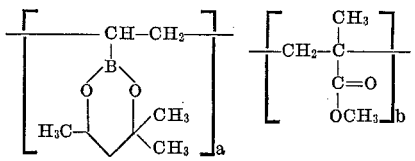

where the ratio $a:b$ is about 1:2.24.

4. The copolymer of claim 7 where said copolymer has the structural units of the formula:

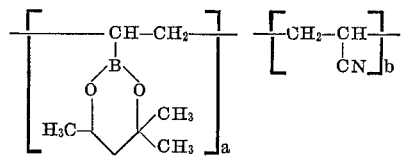

where the ratio of $a:b$ is about 1:1.25.

5. The copolymer of claim 7 wherein said copolymer has the structural units of the formula:

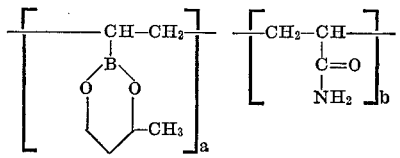

6. The copolymer of claim 7 wherein said copolymer has the structural units of the formula:

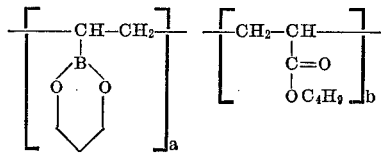

7. The copolymer comprising the structural units:

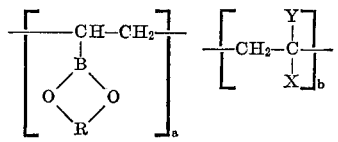

where R is an alkylene radical 3 carbon atoms in length and containing a total of 3 to 20 carbon atoms, Y is selected from the group consisting of hydrogen and lower alkyl, X is selected from the group consisting of phenyl, halophenyl, lower alkyl phenyl, lower acyloxy, amido, cyanide, lower alkyl cyanide, tetra- and hexa- hydro benzene, lower alkyl carboxy, lower alkyl keto, and pyrrolidone, and the weight ratio of $a:b$ is 1:99 to 99:1.

8. The copolymer of claim 7 wherein the weight ratio of $a:b$ is 1:4 to 4:1.

9. The copolymer of claim 7 wherein the weight ratio of $a:b$ is 1:1.5 to 1.5:1.

10. The copolymer of claim 7, wherein the radical

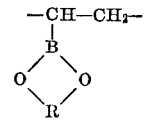

is derived from 2-vinyl-1,3,2-dioxaborinane.

11. The copolymer of claim 7, wherein the radical

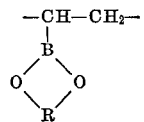

is derived from 2-vinyl-4-methyl-1,3,2-dioxaborinane.

12. The copolymer of claim 7, wherein the radical

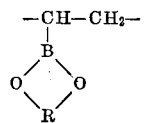

is derived from 2-vinyl-4,4,6-trimethyl-1,3,2-dioxaborinane.

References Cited

UNITED STATES PATENTS

| 2,636,027 | 4/1953 | Coover et al. (I) | 260—85.5 |
| 2,751,364 | 6/1956 | Whetstone et al. | 260—17 |
| 2,759,912 | 8/1956 | Coover et al. (II) | 260—85.5 |
| 3,234,191 | 2/1966 | Woods et al. | 260—80 |

FOREIGN PATENTS

| 1,224,181 | 2/1960 | France | 260—462 |

JOSEPH L. SCHOFER, Primary Examiner

S. M. LEVIN, Assistant Examiner

U.S. Cl. X.R.

117—143, 155; 260—78.5, 80.3, 82.1, 85.5, 85.7, 86.1, 87.5, 88.1, 462

UNITED STATES PATENT OFFICE
CERTIFICATE OF CORRECTION

Patent No. 3,553,170          Dated Jan. 5, 1971

Inventor(s) William G. Woods, Irving S. Bengelsdorf and Don L. Hunter

It is certified that error appears in the above-identified patent and that said Letters Patent are hereby corrected as shown below:

Column 1, line 30, "vinyldioxaborinances" should be --vinyldioxaborinanes--;

Column 1, line 59, "emboidments" should be --embodiments--;

Column 2, line 42, "perparation" should be --preparation--;

Column 3, line 29, "that" should be --than--;

Column 3, line 42, "o-chlorostyrent" should be --o-chlorosty

Column 3, line 63, "dimethyl-α,α'-azo-bis-diisoburate" shoul be --dimethyl-α,α'-azo-bis-diisobutrate--;

Column 3, line 72, after the word "able" insert the words --compounds can be polymerized--;

Column 4, line 20, "reaction" should be --reactions--;

Column 4, line 42, "acryl-" should be --acrylo- --;

UNITED STATES PATENT OFFICE
CERTIFICATE OF CORRECTION

Patent No. 3,553,170            Dated Jan. 5, 1971

Inventor(s) William G. Woods, Irving S. Bengelsdorf and Don L. Hunter

It is certified that error appears in the above-identified patent and that said Letters Patent are hereby corrected as shown below:

PAGE - 2

Column 6, line 35

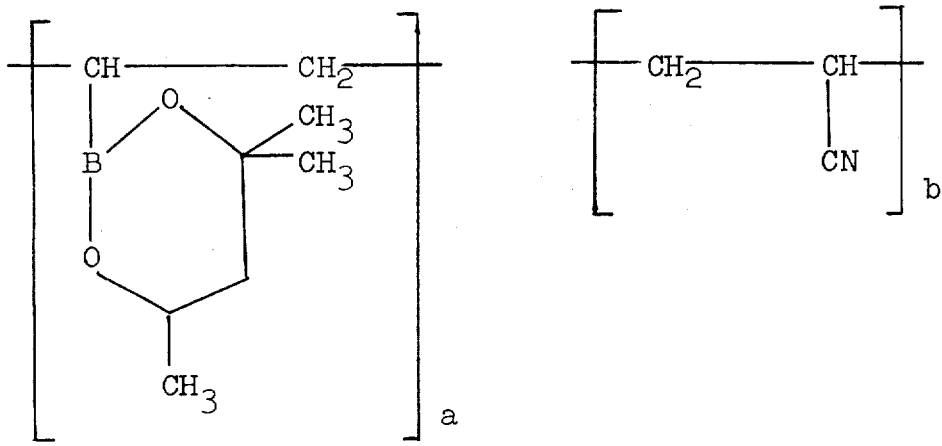

Signed and sealed this 8th day of June 1971.

(SEAL)
Attest:

EDWARD M. FLETCHER, JR.            WILLIAM E. SCHUYLER, JR.
Attesting Officer                   Commissioner of Patents